(12) United States Patent
Credelle et al.

(10) Patent No.: US 7,864,194 B2
(45) Date of Patent: *Jan. 4, 2011

(54) SYSTEMS AND METHODS FOR MOTION ADAPTIVE FILTERING

(75) Inventors: Thomas Lloyd Credelle, Morgan Hill, CA (US); Stuart Philip Kaler, San Francisco, CA (US)

(73) Assignee: Samsung Electronics Co., Ltd. (KR)

( * ) Notice: Subject to any disclaimer, the term of this patent is extended or adjusted under 35 U.S.C. 154(b) by 904 days.

This patent is subject to a terminal disclaimer.

(21) Appl. No.: 11/625,211

(22) Filed: Jan. 19, 2007

(65) Prior Publication Data

US 2007/0115298 A1    May 24, 2007

Related U.S. Application Data

(63) Continuation of application No. 10/379,765, filed on Mar. 4, 2003, now Pat. No. 7,167,186.

(51) Int. Cl.
*G09G 5/00* (2006.01)

(52) U.S. Cl. .................. 345/613; 345/214; 345/475; 345/619; 345/684; 345/685; 345/687; 345/691; 382/198; 348/452; 348/700

(58) Field of Classification Search .......... 345/685, 345/687; 382/198
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,439,759 A | 3/1984 | Fleming et al. |
| 4,593,978 A | 6/1986 | Mourey et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Strathman |
| 4,874,986 A | 10/1989 | Menn et al. |
| 4,886,343 A | 12/1989 | Johnson |
| 4,908,609 A | 3/1990 | Stroomer |

(Continued)

FOREIGN PATENT DOCUMENTS

DE      299 09 537 U1     10/1999

(Continued)

OTHER PUBLICATIONS

Adobe Systems, Inc., website, 2002, http://www.adobe.com/products/acrobat/cooltype.html.

(Continued)

*Primary Examiner*—Antonio A Caschera
(74) *Attorney, Agent, or Firm*—Innovation Counsel LLP

(57) ABSTRACT

Methods and systems for motion adaptive filtering detect movement of text or areas of high spatial frequency in one frame to another frame of an image. When such movement is detected and meets a certain level or threshold, the subpixel rendering processing of such text or areas of high spatial frequency may be changed.

14 Claims, 5 Drawing Sheets

U.S. PATENT DOCUMENTS

| | | | |
|---|---|---|---|
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,010,413 A | 4/1991 | Bahr |
| 5,052,785 A | 10/1991 | Takimoto et al. |
| 5,062,057 A | 10/1991 | Blacken et al. |
| 5,113,274 A | 5/1992 | Takahashi et al. |
| 5,132,674 A | 7/1992 | Bottorf |
| 5,144,288 A | 9/1992 | Hamada et al. |
| 5,184,114 A | 2/1993 | Brown |
| 5,189,404 A | 2/1993 | Masimo et al. |
| 5,196,924 A | 3/1993 | Lumelsky et al. |
| 5,233,385 A | 8/1993 | Sampsell |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,416,890 A | 5/1995 | Beretta |
| 5,436,747 A | 7/1995 | Suzuki |
| 5,438,649 A | 8/1995 | Ruetz |
| 5,448,652 A | 9/1995 | Vaidyanathan et al. |
| 5,450,216 A | 9/1995 | Kasson |
| 5,461,503 A | 10/1995 | Deffontaines et al. |
| 5,477,240 A * | 12/1995 | Huebner et al. ............. 345/685 |
| 5,485,293 A | 1/1996 | Robinder |
| 5,535,028 A | 7/1996 | Bae et al. |
| 5,541,653 A | 7/1996 | Peters et al. |
| 5,543,819 A * | 8/1996 | Farwell et al. ............. 345/694 |
| 5,561,460 A | 10/1996 | Katoh et al. |
| 5,563,621 A | 10/1996 | Silsby |
| 5,579,027 A | 11/1996 | Sakurai et al. |
| 5,642,176 A | 6/1997 | Abukawa et al. |
| 5,648,793 A | 7/1997 | Chen |
| 5,694,186 A | 12/1997 | Yanagawa et al. |
| 5,719,639 A | 2/1998 | Imamura |
| 5,724,442 A | 3/1998 | Ogatsu et al. |
| 5,731,818 A | 3/1998 | Wan et al. |
| 5,739,802 A | 4/1998 | Mosier |
| 5,748,828 A | 5/1998 | Steiner et al. |
| 5,754,163 A | 5/1998 | Kwon |
| 5,754,226 A | 5/1998 | Yamada et al. |
| 5,792,579 A | 8/1998 | Phillips |
| 5,815,101 A | 9/1998 | Fonte |
| 5,818,405 A | 10/1998 | Eglit et al. |
| 5,821,913 A | 10/1998 | Mamiya |
| 5,899,550 A | 5/1999 | Masaki |
| 5,917,556 A | 6/1999 | Katayama |
| 5,929,843 A | 7/1999 | Tanioka |
| 5,933,253 A | 8/1999 | Ito et al. |
| 5,949,496 A | 9/1999 | Kim |
| 5,973,664 A | 10/1999 | Badger |
| 5,990,997 A | 11/1999 | Jones et al. |
| 6,002,446 A | 12/1999 | Eglit |
| 6,008,868 A | 12/1999 | Silverbrook |
| 6,034,666 A | 3/2000 | Kanai et al. |
| 6,038,031 A | 3/2000 | Murphy |
| 6,049,626 A | 4/2000 | Kim |
| 6,054,832 A | 4/2000 | Kunzman et al. |
| 6,061,533 A | 5/2000 | Kajiwara |
| 6,064,363 A | 5/2000 | Kwon |
| 6,097,367 A | 8/2000 | Kuriwaki et al. |
| 6,100,872 A | 8/2000 | Aratani et al. |
| 6,108,122 A | 8/2000 | Ulrich et al. |
| 6,144,352 A | 11/2000 | Matsuda et al. |
| 6,147,664 A | 11/2000 | Hansen |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,019 B1 | 4/2001 | Hasegawa |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,278,434 B1 | 8/2001 | Hill et al. |
| 6,297,826 B1 | 10/2001 | Semba et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,332,030 B1 | 12/2001 | Manjunath |
| 6,335,719 B1 | 1/2002 | An et al. |
| 6,342,876 B1 | 1/2002 | Kim |
| 6,346,972 B1 | 2/2002 | Kim |
| 6,348,929 B1 | 2/2002 | Acharya |
| 6,360,008 B1 | 3/2002 | Suzuki et al. |
| 6,360,023 B1 | 3/2002 | Betrisey et al. |
| 6,377,262 B1 | 4/2002 | Hitchcock et al. |
| 6,384,836 B1 | 5/2002 | Naylor, Jr. et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,414,719 B1 | 7/2002 | Parikh |
| 6,417,867 B1 | 7/2002 | Hallberg |
| 6,429,867 B1 | 8/2002 | Deering |
| 6,441,867 B1 | 8/2002 | Daly |
| 6,453,067 B1 | 9/2002 | Morgan et al. |
| 6,466,618 B1 | 10/2002 | Messing et al. |
| 6,469,766 B2 | 10/2002 | Waterman et al. |
| 6,483,518 B1 | 11/2002 | Perry et al. |
| 6,545,653 B1 | 4/2003 | Takahara |
| 6,545,740 B2 * | 4/2003 | Werner ..................... 352/50 |
| 6,552,706 B1 | 4/2003 | Ikeda et al. |
| 6,570,584 B1 | 5/2003 | Cok et al. |
| 6,600,495 B1 | 7/2003 | Boland et al. |
| 6,624,828 B1 | 9/2003 | Dresevic et al. |
| 6,661,429 B1 | 12/2003 | Phan |
| 6,674,430 B1 | 1/2004 | Kaufman |
| 6,674,436 B1 | 1/2004 | Dresevic et al. |
| 6,681,053 B1 | 1/2004 | Zhu |
| 6,714,212 B1 | 3/2004 | Tsuboyama et al. |
| 6,738,526 B1 | 5/2004 | Betrisey et al. |
| 6,750,875 B1 | 6/2004 | Keely, Jr. |
| 6,781,626 B1 | 8/2004 | Wang |
| 6,801,220 B2 | 10/2004 | Greier et al. |
| 6,804,407 B2 | 10/2004 | Weldy |
| 7,167,186 B2 * | 1/2007 | Credelle et al. ............. 345/613 |
| 2001/0017515 A1 | 8/2001 | Kusunoki et al. |
| 2001/0040645 A1 | 11/2001 | Yamazaki |
| 2001/0048764 A1 | 12/2001 | Betrisey et al. |
| 2002/0012071 A1 | 1/2002 | Sun |
| 2002/0015110 A1 | 2/2002 | Elliott |
| 2002/0017645 A1 | 2/2002 | Yamazaki |
| 2002/0122160 A1 | 9/2002 | Kunzman |
| 2002/0140831 A1 | 10/2002 | Hayashi |
| 2002/0149598 A1 | 10/2002 | Greier et al. |
| 2002/0190648 A1 | 12/2002 | Bechtel et al. |
| 2003/0011603 A1 | 1/2003 | Koyama |
| 2003/0011613 A1 | 1/2003 | Booth, Jr. |
| 2003/0034992 A1 | 2/2003 | Brown Elliott et al. |
| 2003/0043567 A1 | 3/2003 | Hoelen et al. |
| 2003/0071775 A1 | 4/2003 | Ohashi et al. |
| 2003/0071826 A1 | 4/2003 | Goertzen |
| 2003/0071943 A1 | 4/2003 | Choo et al. |
| 2003/0077000 A1 | 4/2003 | Blinn |

| | | | |
|---|---|---|---|
| 2003/0085906 A1 | 5/2003 | Elliott et al. | |
| 2003/0146893 A1 | 8/2003 | Sawabe | |
| 2003/0218618 A1 | 11/2003 | Phan | |
| 2004/0008208 A1 | 1/2004 | Dresevic et al. | |
| 2004/0036704 A1 | 2/2004 | Han et al. | |
| 2004/1002180 | 2/2004 | Hong et al. | |
| 2004/0061710 A1 | 4/2004 | Messing et al. | |
| 2004/0085495 A1 | 5/2004 | Roh et al. | |
| 2004/0095521 A1 | 5/2004 | Song et al. | |
| 2004/0114046 A1 | 6/2004 | Lee et al. | |
| 2004/0150651 A1 | 8/2004 | Phan | |
| 2004/0169807 A1 | 9/2004 | Rho et al. | |
| 2004/0179160 A1 | 9/2004 | Rhee et al. | |
| 2004/0213449 A1 | 10/2004 | Safaee-Rad | |
| 2004/0239837 A1 | 12/2004 | Hong et al. | |
| 2004/0247070 A1 | 12/2004 | Ali | |
| 2005/0031199 A1 | 2/2005 | Ben-Chorin et al. | |
| 2005/0094871 A1 | 5/2005 | Berns et al. | |
| 2005/0134600 A1 | 6/2005 | Credelle et al. | |
| 2005/0151752 A1 | 7/2005 | Phan | |
| 2005/0162600 A1 | 7/2005 | Rho et al. | |
| 2005/0169551 A1 | 8/2005 | Messing et al. | |

FOREIGN PATENT DOCUMENTS

| | | | |
|---|---|---|---|
| DE | 199 23 527 | | 11/2000 |
| DE | 201 09 354 | U1 | 9/2001 |
| EP | 0 158 366 | A2 | 10/1985 |
| EP | 0 203 005 | A1 | 11/1986 |
| EP | 0 322 106 | A2 | 6/1989 |
| EP | 0 0671 650 | | 9/1995 |
| EP | 0 793 214 | A1 | 9/1997 |
| EP | 0 812 114 | A1 | 12/1997 |
| EP | 0 878 969 | | 11/1998 |
| EP | 0 899 604 | A2 | 3/1999 |
| EP | 1 083 539 | A2 | 3/2001 |
| EP | 1 261 014 | A2 | 11/2002 |
| EP | 1 381 020 | A2 | 1/2004 |
| GB | 2 133 912 | A | 8/1984 |
| GB | 2 146 478 | A | 4/1985 |
| JP | 60-107022 | | 6/1985 |
| JP | 02-000826 | A | 1/1990 |
| JP | 03-078390 | | 4/1991 |
| JP | 03-36239 | B | 5/1991 |
| JP | 06-102503 | | 4/1994 |
| JP | 11-282008 | | 10/1999 |
| JP | 02-983027 | B2 | 11/1999 |
| JP | 2001203919 | | 7/2001 |
| JP | 2002215082 | A | 7/2002 |
| JP | 2004-4822 | | 8/2004 |
| JP | 2004-78218 | | 11/2004 |
| WO | WO 97/23860 | | 7/1997 |
| WO | WO 00/21067 | | 4/2000 |
| WO | WO 00/42564 | | 7/2000 |
| WO | WO 00/42762 | | 7/2000 |
| WO | WO 00/45365 | | 8/2000 |
| WO | WO 00/67196 | | 11/2000 |
| WO | WO 01/10112 | A2 | 2/2001 |
| WO | WO 01/29817 | A1 | 4/2001 |
| WO | WO 01/52546 | A2 | 7/2001 |
| WO | WO 02/059685 | A2 | 8/2002 |
| WO | WO 03/014819 | A1 | 2/2003 |
| WO | WO 2004/017129 | A1 | 2/2004 |
| WO | WO 2004/086128 | A1 | 3/2004 |
| WO | WO 2004/027503 | A1 | 4/2004 |
| WO | WO 2004/040548 | A1 | 5/2004 |
| WO | WO 2005/065027 | A2 | 7/2005 |

OTHER PUBLICATIONS

Betrisey, C., et al., "Displaced Filtering for Patterned Displays," 2000, *Society for Information Display (SID) 00 Diciest*, pp. 296-299.

Carvajal, D., "Big Publishers Looking Into Digital Books," Apr. 3, 2000, *The New York Times*, Business/Financial Desk.

"ClearType magnified," *Wired Magazine*, Nov. 8, 1999, Microsoft Typography, article posted Nov. 8, 1999, and last updated Jan. 27, 1999, © 1999 Microsoft Corporation, 1 page.

Credelle, Thomas L. et al., "P-00: MTF of High-Resolution PenTile Matrix™ Displays," *Eurodisplay 02 Digest*, 2002, pp. 1-4.

Daly, Scott, "Analysis of Subtriad Addressing Algorithms by Visual System Models," *SID Symp Digest*, Jun. 2001, pp. 1200-1203.

Elliott, C., "Active Matrix Display Layout Optimization for Subpixel Image Rendering," Sep. 2000, Proceedings of the $1^{st}$ International Display Manufacturing Conference, pp. 185-189.

Elliott, Candice H. Brown et al., "Color Subpixel Rendering Projectors and Flat Panel Displays," New Initiatives in Motion Imaging, SMPTE Advanced Motion Imaging Conference, Feb. 27-Mar. 1, 2003, Seattle, Washington, pp. 1-4.

Elliott, Candice H. Brown et al., "Co-optimization of Color AMLCD Subpixl Architecture and Rendering Algorithms," *SID Symp. Digest*, May 2002, pp. 172-175.

Elliott, C., "New Pixel Layout for PenTile Matrix," Jan. 2002, Proceedings of the International Display Manufacturing Conference, pp. 115-117.

Elliott, C., "Reducing Pixel Count without Reducing Image Quality," Dec. 1999, *Information Display*, vol. 15, pp. 22-25.

Feigenblatt, R.I., "Full-color imaging on amplitude-quantized color mosaic displays," *SPIE*, vol. 1075, Digital Image Processing Applications,1989, pp. 199-204.

Gibson Research Corporation, website, "Sub-Pixel Font Rendering Technology, How It Works," 2002, http://www.grc.com/ctwhat.html.

Johnston, Stuart J., "An Easy Read: Microsoft's ClearType," *InformationWeek Online*, Redmond, WA, Nov. 23, 1998, 3 pages.

Johnston, Stuart J., "Clarifying ClearType," *InformationWeek Online*, Redmond, WA, Jan. 4, 1999, 4 pages.

"Just Outta Beta," *Wired Magazine*, Dec. 1999, Issue 7.12, 3 pages.

Klompenhouwer, Michiel A. et al., "Subpixel Image Scaling for Color Matrix Displays," *SID Symp. Digest*, May 2002, pp. 176-179.

Krantz, John H. et al., "Color Matrix Display Image Quality: The Effects of Luminance and Spatial Sampling," *SID International Symposium, Digest of Technical Papers*, 1990, pp. 29-32.

Lee, Baek-woon et al., "40.5L: Late-News Paper: TFT-LCD with RGBW Color System," *SID 03 Digest*, 2003, pp. 1212-1215.

Markoff, John, "Microsoft's Cleartype Sets Off Debate on Originality," *The New York Times*, Dec. 7, 1998, 5 pages.

Martin, R., et al., "Detectability of Reduced Blue Pixel Count in Projection Displays," May 1993, *Society for Information Display (SID) 93 Digest*, pp. 606-609.

Messing, Dean S. et al., "Improved Display Resolution of Subsampled Colour Images Using Subpixel Addressing," *Proc. Int. Conf. Image Processing (ICIP '02)*, Rochester, N. Y., IEEE Signal Processing Society, 2002, vol. 1, pp. 625-628.

Messing, Dean S. et al., "Subpixel Rendering on Non-Striped Colour Matrix Displays," *International Conference on Image Processing*, Barcelona, Spain, Sep. 2003, 4 pages.

"Microsoft ClearType," http://www.microsoft.com/opentype/cleartype, Mar. 26, 2003, 4 pages.

Microsoft Corporation, website, http://www.microsoft.com/typography/cleartype, 2002, 7 pages.

Microsoft Press Release, Nov. 15, 1998, Microsoft Research Announces Screen Display Breakthrough at COMDEX/Fall '98, PR Newswire.

Murch, M., "Visual Perception Basics," 1987, *SID*, Seminar 2, Tektronix, Inc., Beaverton, Oregon.

Okumura, H., et al., "A New Flicker-Reduction Drive Method for High-Resolution LCTVs," May 1991, *Society for Information Display (SID) International Symposium Digest of Technical Papers*, pp. 551-554.

Platt, John C., "Optimal Filtering for Patterned Displays," Microsoft Research *IEEE Signal Processing Letters*, 2000, 4 pages.

Platt, John, "Technical Overview of ClearType Filtering," Microsoft Research, http://www.research.microsoft.com/users/jplatt/cleartype/default.aspx, Sep. 17, 2002, 3 pages.

Poor, Alfred, "LCDs: The 800-pound Gorilla," *Information Display*, Sep. 2002, pp. 18-21.

"Ron Feigenblatt's remarks on Microsoft ClearType™," http://www.geocities.com/SiliconValleyRidge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub-Pixel Font Rendering Technology," © 2003 Gibson Research Corporation, Laguna Hills, CA, 2 pages.

Wendell, Brian A., Stanford University, "Fundamentals of Vision: Behavior, Neuroscience and Computation," Jun. 12, 1994, *Society for Information Display* (*SID*) *Short Course S-2*, Fairmont Hotel, San Jose, California.

Werner, Ken, "OLEDs, OLEDs, Everywhere . . . ," *Information Display*, Sep. 2002, pp. 12-15.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, " Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Reducing Pixel Count Without Reducing Image Quality", Information Display Dec. 1999, vol. 1, pp. 22-25.

Feigenblatt, Ron, "Remarks on Microsoft ClearType™ ", http://www.geocities.com/SiliconValley/Ridge/6664/ClearType.html, Dec. 5, 1998, Dec. 7, 1998, Dec. 12, 1999, Dec. 26, 1999, Dec. 30.

Wandell, Brian A., Stanford University, "Fundamentals of Vision: Behavior . . . ," Jun. 12, 1994, Society for Information Display (SID) Short Course S-2, Fairmont Hotel, San Jose.

Notice of Allowance, dated Dec. 15, 2004 in US Patent No. 6,917,368 (U.S. Appl. No. 10/379,766).

Non-Final Office Action, dated Feb. 3, 2005 in US Publication No. 2004/0196302 (U.S. Appl. No. 10/379,767).

Response to Non-Final Office Action, dated Aug. 1, 2005 in US Publication No. 2004/0196302 (U.S. Appl. No. 10/379,767).

Final Office Action, dated Oct. 19, 2005 in US Publication No. 2004/0196302 (U.S. Appl. No. 10/379,767).

Response to Final Office Action, dated Mar. 23, 2006 in US Publication No. 2004/0196302 (U.S. Appl. No. 10/379,767).

USPTO, Non-Final Office Action, dated Mar. 24, 2005 in US Patent Publication No. 2003/0085906, (U.S. Appl. No. 10/215,843).

Clairvoyants Inc, Response to Non-Final Office Action, dated Sep. 26, 2005 in US Patent Publication No. 2003/0085906, (U.S. Appl. No. 10/215,843).

USPTO, Final Office Action, dated Jan. 25, 2006 in US Patent Publication No. 2003/0085906, (U.S. Appl. No. 10/215,843).

Clairvoyante Inc, Response to Non-Final Office Action, dated Jun. 26, 2006 in US Patent Publication No. 2003/0085906, (U.S. Appl. No. 10/215,843).

USPTO, Notice of Allowance, dated Jul. 16, 2006 in US Patent Publication No. 2003/0085906, (U.S. Appl. No. 10/215,843).

USPTO, Non-Final Office Action, dated Aug. 1, 2006 in US Patent Publication No. 2005/0134600, (U.S. Appl. No. 11/048,498).

* cited by examiner

SYSTEMS AND METHODS FOR MOTION ADAPTIVE FILTERING

RELATED APPLICATIONS

This application is a continuation of commonly owned and copending U.S. patent application Ser. No. 10/379,765 filed on Mar. 4, 2003, and claims as a priority date the benefit of the filing date thereof under 35 U.S.C. §120. U.S. patent application Ser. No. 10/379,765 is published as United States patent Publication No. 2004/0174380 A1 which is hereby incorporated by reference herein for all that it teaches.

Subject matter in the present application is related to subject matter in the following United States patent documents: (1) United States patent Publication No. 2004/0196302 (the '302 application) [U.S. patent application Ser. No. 10/379,767] entitled "SYSTEMS AND METHODS FOR TEMPORAL SUBPIXEL RENDERING OF IMAGE DATA," and (2) commonly owned U.S. Pat. No. 6,917,368 (the '368 patent) [U.S. patent application Ser. No. 10/379,766], entitled "SUB-PIXEL RENDERING SYSTEM AND METHOD FOR IMPROVED DISPLAY VIEWING ANGLES," which are hereby incorporated herein by reference.

BACKGROUND

In commonly owned United States patent Applications: (1) U.S. Pat. No. 6,903,754 (the '754 patent) [U.S. patent application Ser. No. 09/916,232], entitled "ARRANGEMENT OF COLOR PIXELS FOR FULL COLOR IMAGING DEVICES WITH SIMPLIFIED ADDRESSING," filed Jul. 25, 2001; (2) United States patent Publication No. 2003/0128225 (the '225 application) [U.S. patent application Ser. No. 10/278,353], entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States patent Publication No. 2003/0128179 (the '179 application) [U.S. patent application Ser. No. 10/278,352], entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed Oct. 22, 2002; (4) United States patent Publication No. 2004/0051724 (the '724 application) [U.S. patent application Ser. No. 10/243,094], entitled "IMPROVED FOUR COLOR ARRANGEMENTS AND EMITTERS FOR SUBPIXEL RENDERING," filed Sep. 13, 2002; (5) United States patent Publication No. 2003/0117423 (the '423 application) [U.S. patent application Ser. No. 10/278,328], entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States patent Publication No. 2003/0090581 (the '581 application) [U.S. patent application Ser. No. 10/278,393], entitled "COLOR DISPLAY HAVING HORIZONTAL SUB-PIXEL ARRANGEMENTS AND LAYOUTS" filed Oct. 22, 2002; (7) United States patent Publication No. 2004/0080479 (the '479 application) [U.S. patent application Ser. No. 10/347,001], entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, novel subpixel arrangements are therein disclosed for improving the cost/performance curves for image display devices and herein incorporated by reference.

These improvements are particularly pronounced when coupled with subpixel rendering (SPR) systems and methods further disclosed in those applications and in commonly owned United States patent Applications: (1) U.S. patent Publication No. 2003/0034992 (the '992 application) [U.S. patent application Ser. No. 10/051,612], entitled "CONVERSION OF RGB PIXEL FORMAT DATA TO PENTILE MATRIX SUB-PIXEL DATA FORMAT," filed Jan. 16, 2002; (2) United States patent Publication No. 2003/0103058 (the '058 application) [U.S. patent application Ser. No. 10/150,355], entitled "METHODS AND SYSTEMS FOR SUB-PIXEL RENDERING WITH GAMMA ADJUSTMENT," filed May 17, 2002; (3) U.S. patent Publication No. 2003/0085906 (the '906 application) [U.S. patent application Ser. No. 10/215,843], entitled "METHODS AND SYSTEMS FOR SUB-PIXEL RENDERING WITH ADAPTIVE FILTERING," filed Aug. 8, 2002—all patent applications and other references mentioned in this specification are herein incorporated by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

As was described in the two related patent applications noted above, some panel technologies—most notably liquid crystal displays (LCDs)—exhibit color error on subpixel rendered text or other areas of high spatial frequency ("HSF") when viewed by an observer at an off-normal axis viewing angle. Those related applications disclose systems and methods for correcting such color error from off-normal viewing angles.

Color errors from other than off-normal viewing angle may be noticeable by viewers on some LCDs—even when observing from the normal axis to the display panel. For example, moving subpixel rendered text (or other areas of high spatial frequency) may produce color error while in motion. One example of this effect is scrolling text in a word processor application window. Depending on the panel technology (e.g. twisted nematic TN-LCD), the color error may be quite noticeable—and possibly distracting to a user—while scrolling the text. Of course, once the scrolling or motion stops, the color error typically ceases as the response time of TN LCD have time to "catch up" to the now-stationary text.

Figure 1A:
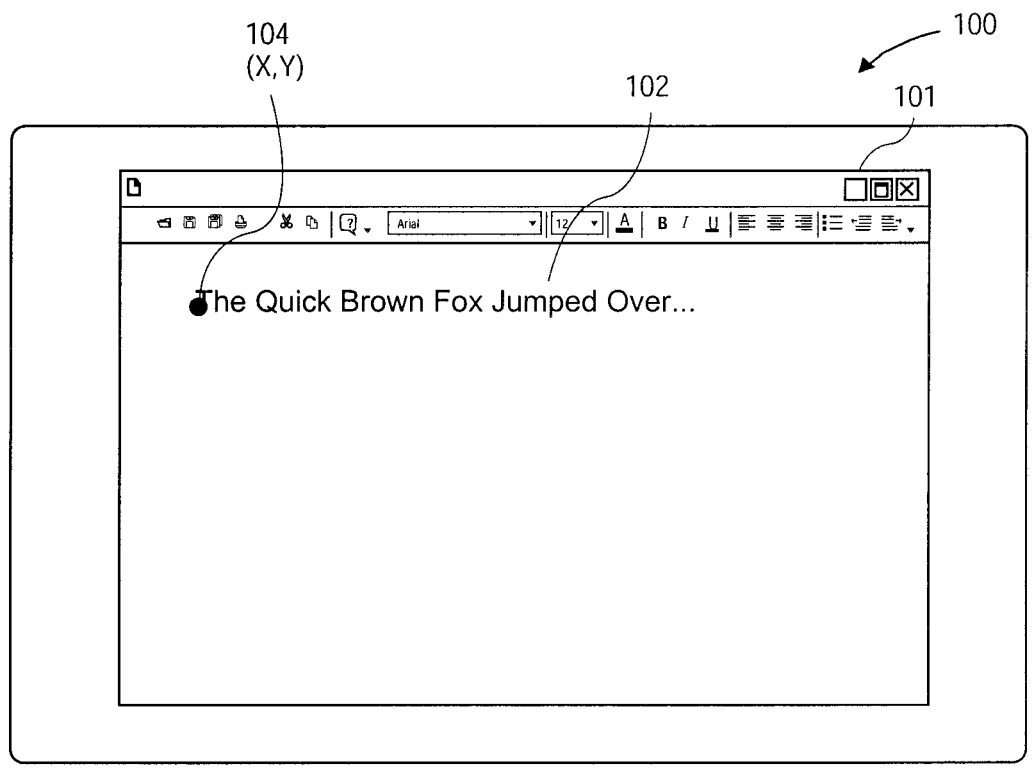
FIGS. 1A and 1B depict a display screen with a word processing window open having text on the rendered in the window and scrolling down the screen.
Figure 1B:
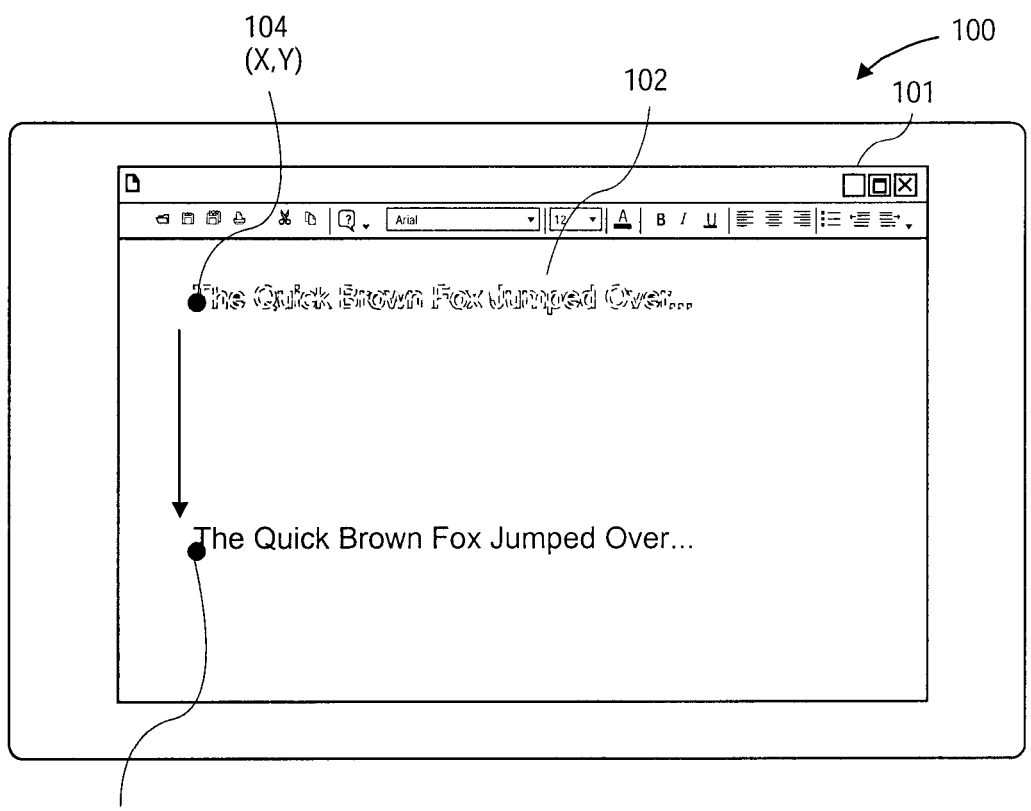

FIGS. 1A and 1B depict the situation in the one example noted. Display panel 100 is shown having a word processing application sending image data to the panel in a window 101. In the word processing window, there is some text 102 which is a paradigm example of high spatial frequency data. One point of the text 104 (e.g. an edge point of the character "T") is at coordinate point (X,Y) on the panel in FIG. 1A. As the text is scrolled down, the edge point moves to an new coordinate point 106 (X', Y') on the panel in FIG. 1B. During the time the edge point was in transit between points 104 and 106, the "T" was visible on screen and was "moving" frame-by-frame down to its new point. If the response time of the panel's rendering technology (e.g. liquid crystal) is not sufficiently fast, then, if the "T" was being subpixel rendered at the time, color error may be noticeable.

Figure 2:
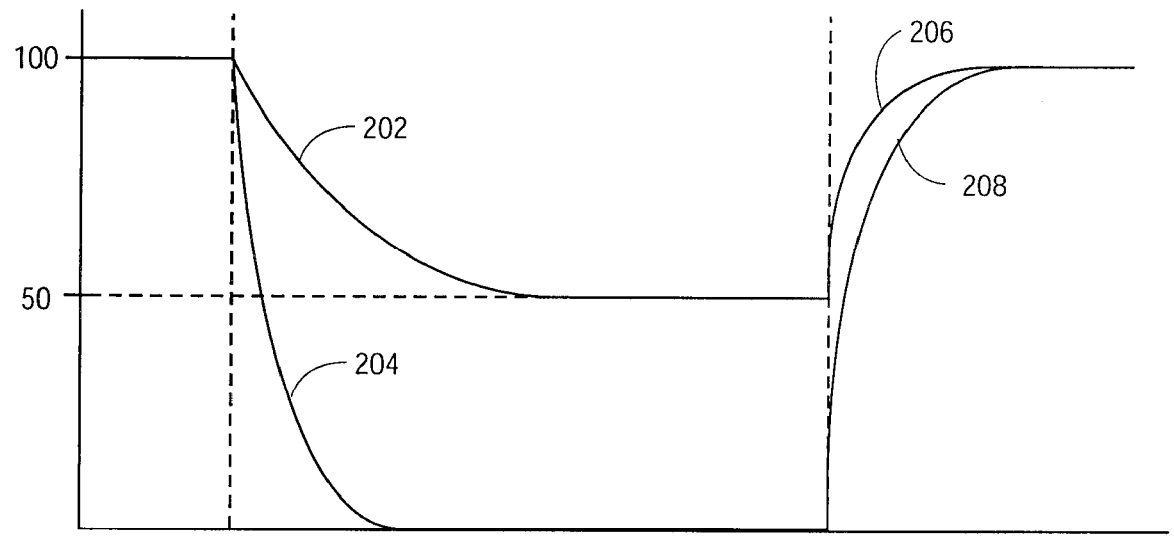
FIG. 2 shows the performance curves of a liquid crystal display at the 100% illumination curve and the 50% illumination curve versus time.

FIG. 2 shows response curves for liquid crystal in going from either 100% or 50% illumination down to 0% illuminations (i.e. curves 202 and 204 respectively) and from 50% or 0% illumination up to 100% illumination (i.e. curves 206 and 208 respectively) and gives a better explanation as the nature of the problem. For example, when black text is rendered on display having a repeat subpixel grouping such as found in FIG. 5 of the related application, entitled "SYSTEMS AND METHODS FOR TEMPORAL SUBPIXEL RENDERING OF IMAGE DATA," the green subpixels switch from 100% to 0% while the red and blue pixels switch from 100% to 50%. During motion of black text, the green pixels are therefore switching from 100% to 0% to 100%—while the red and the blue are switching from 100% to 50% to 100%. As is illustrated, the response time of the 100% to 0% is much faster than the 100% to 50%.

During motion of black text then, there will be an unbalanced condition of the brightness of red, green and blue pixels, which leads to color error. In fact, there will tend to be too much red and blue brightness which causes a magenta hue to the text. The transition from 0% to 100% is approximately the same as 50% to 100% so doesn't materially add to color error in this example. However, in other LCD modes, this transition could also have larger differences and will lead to color error during motion.

One embodiment to reduce the amount of color error on moving subpixel rendered text and other high spatial frequency image data is to employ an adaptive filter technique. An adaptive filter test may be used to detect motion of high-spatial-frequency edges in an image. When the moving edges are detected, subpixel rendering (SPR) of the text can be changed to a new state. After the moving edges are stationary, the SPR is turned back to the regular mode. Techniques such as those disclosed in the '906 application can be used to detect the edges and to detect the high frequency transitions in the data. A simple counter can be used with the SPR algorithm that counts the number of times an edge is detected in an image. Statistically, a large number of edges means that text is detected. If a low number of edges are detected, then the image is probably pictorial. Since this problem occurs primarily on edges of text, one embodiment might be to employ the change in filters for text only.

Figure 3:
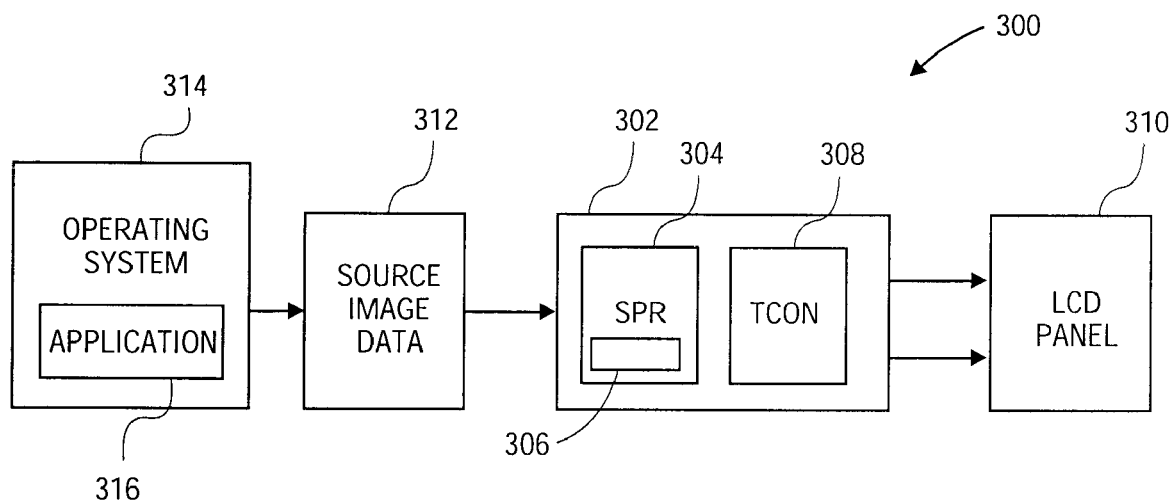
FIG. 3 depicts one possible embodiment of a system made in accordance with the principles of the present invention.

FIG. 3 depicts one system embodiment 300 for motion adaptive filtering. System 300 comprises a graphics subsystem 302 having a SPR subsystem 304 which comprises systems and methods of subpixel rendering source (such as those disclosed in the '612 application, '058 application, and the '843 application) image data 312 which is input into the graphics subsystem. The source image data may typically be generated by the operating system 314 or an application 316 and sent to the graphics subsystem for rendering on the display.

A memory 306 is available to SPR subsystem 304 to retain information about the number of and/or locations of points of high spatial frequency in the source image data. A timing controller (TCON) 308 is optionally provided to give timing commands to a display panel 310 which could be a LCD or any other technology having a suitably different response times vs. grey level to produce the color error discussed above. It will be appreciated that the system 300 is merely one possible embodiment to implement the techniques disclosed herein. For example, the SPR subsystem could be an application system integrated circuit (ASIC), field programmable gate array (FPGA), implemented entirely in software under control of a general processor control, or even implemented on the glass of the panel itself (particularly for low temperature polysilicon (LTPS) panels). Additionally, memory 106 could be implemented in RAM of any known species or any other known or future embodiment of memory. One embodiment comprises a graphical subsystem further comprising a subpixel rendering subsystem; a memory coupled to said subpixel rendering subsystem for storing input image data in a plurality of image frames, and a processing subsystem that tests for moving text or other points of high spatial frequency and, when the test indicates moving text or said other areas of high spatial frequency, sends signals to said subpixel rendering subsystem to change the subpixel rendering in successive frames of image data. It will be appreciated that the processing subsystem may be implemented integral or as a part of the subpixel rendering subsystem itself.

Figure 4:
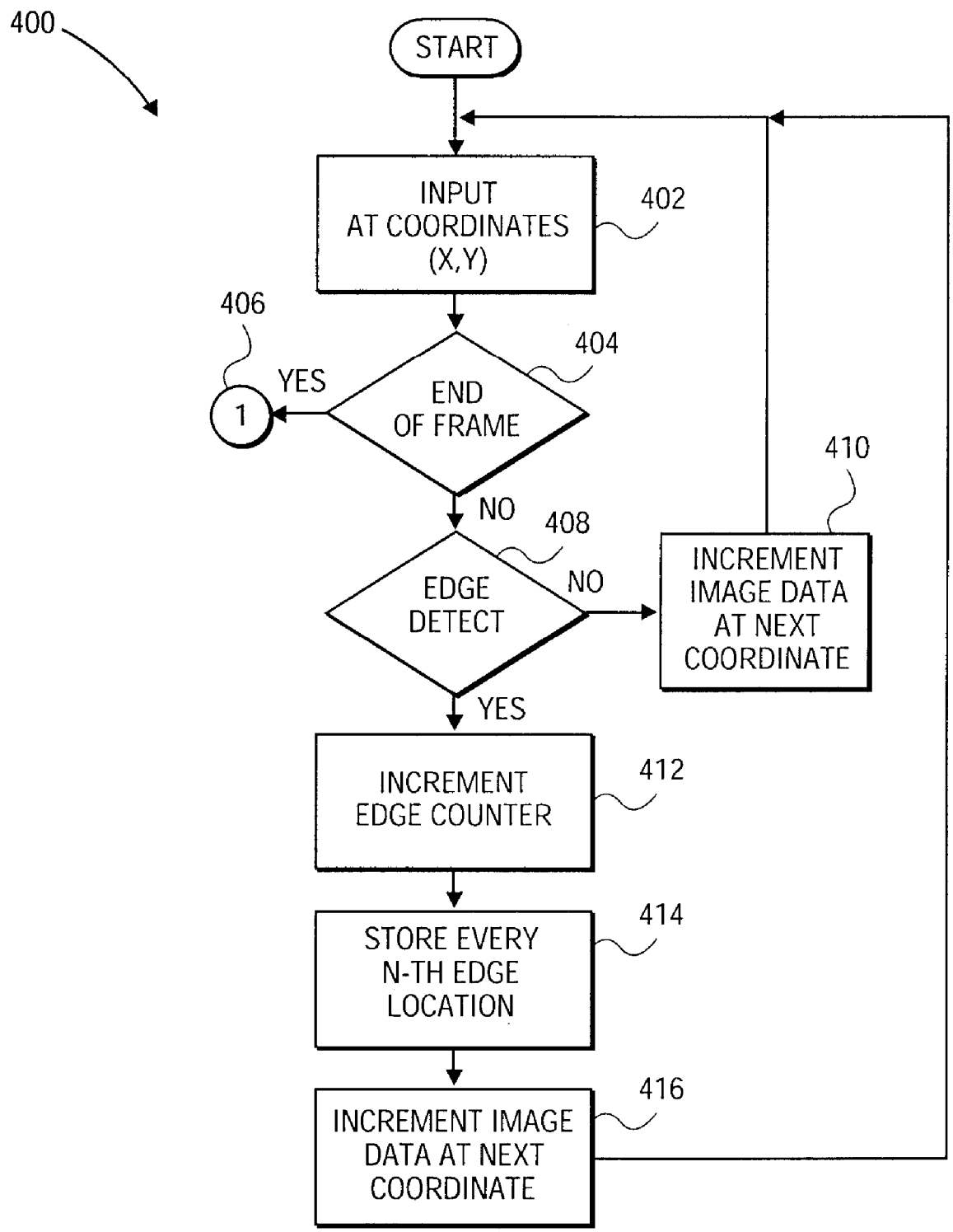
FIGS. 4 and 5 and 6 and 7 are flowcharts of several embodiments of the techniques made in accordance with the principles of the present invention.

FIG. 4 shows one embodiment 400 of implementing a technique for correcting such color errors. In essence, the embodiment involves a display system comprising a graphics subsystem having a subpixel rendering system. The system notes points of high spatial frequency in a first frame of image data; compares the points of high spatial frequency with corresponding points in a second frame of image data; and when a number of points meeting a certain threshold have changed from high spatial frequency to low spatial frequency in the second frame, changing the subpixel rendering on input image data.

The technique starts at step 402 where a image data point at coordinate (X,Y) is input into the SPR subsystem. The point is tested at step 404 to see if it is the point at the end of a frame. If yes, then the technique starts processing at step 406. If not, then the point is tested (via an adaptive filter or by any other means known now or in the future) whether the point is at the edge of a high spatial frequency area (e.g. text) at step 408. If it is not, then at step 410 the image data is incremented at the next coordinate point and returns to step 402. Of course, other SPR functions could be applied to the point at any step of this technique, so the present embodiment may work with other SPR functions in conjunction with noting areas of moving text or HSF areas.

If the point is detected as an edge of text or HSF areas, then a "current" edge counter is incremented to count the number of edge points in a frame (thus, it may be desirable to reset the counter to zero at the beginning of each frame) at step 412. At step 414, the location of every current n-th edge point is stored—possibly in storage 306—where "n" is selected to give a good performance statistically to note areas of moving text or HSF areas. The number "n" takes on all possible ranges between 1 and the total number of addressable points on the screen. However, n=1 (i.e. save up to every possible addressable point on the screen) may be a useful metric if the system designer would want near perfect information as to where all edges of HSF text and images are located—but a lesser number of points would suffice to give a good indication that there are HSF areas in motion on the screen. With n=the total number of addressable points on screen (i.e. save one point of information every screen), this may not be useful as a metric as there may not be enough good data to indicate where there are significant amount of moving HSF text and images to warrant taking an action. Thus, the number "n" is optimally in between these two extreme values.

It will be appreciated that other embodiments could have other criteria for selecting and storing locations of points, including random selection. It is not necessary that a data is stored in modulo arithmetic fashion. It suffices that there are a sufficient number of points to note moving text and HSF areas. At step 416, the image data is incremented to the next location and begins processing at step 402 until there is an end of frame condition detected.

Figure 5:
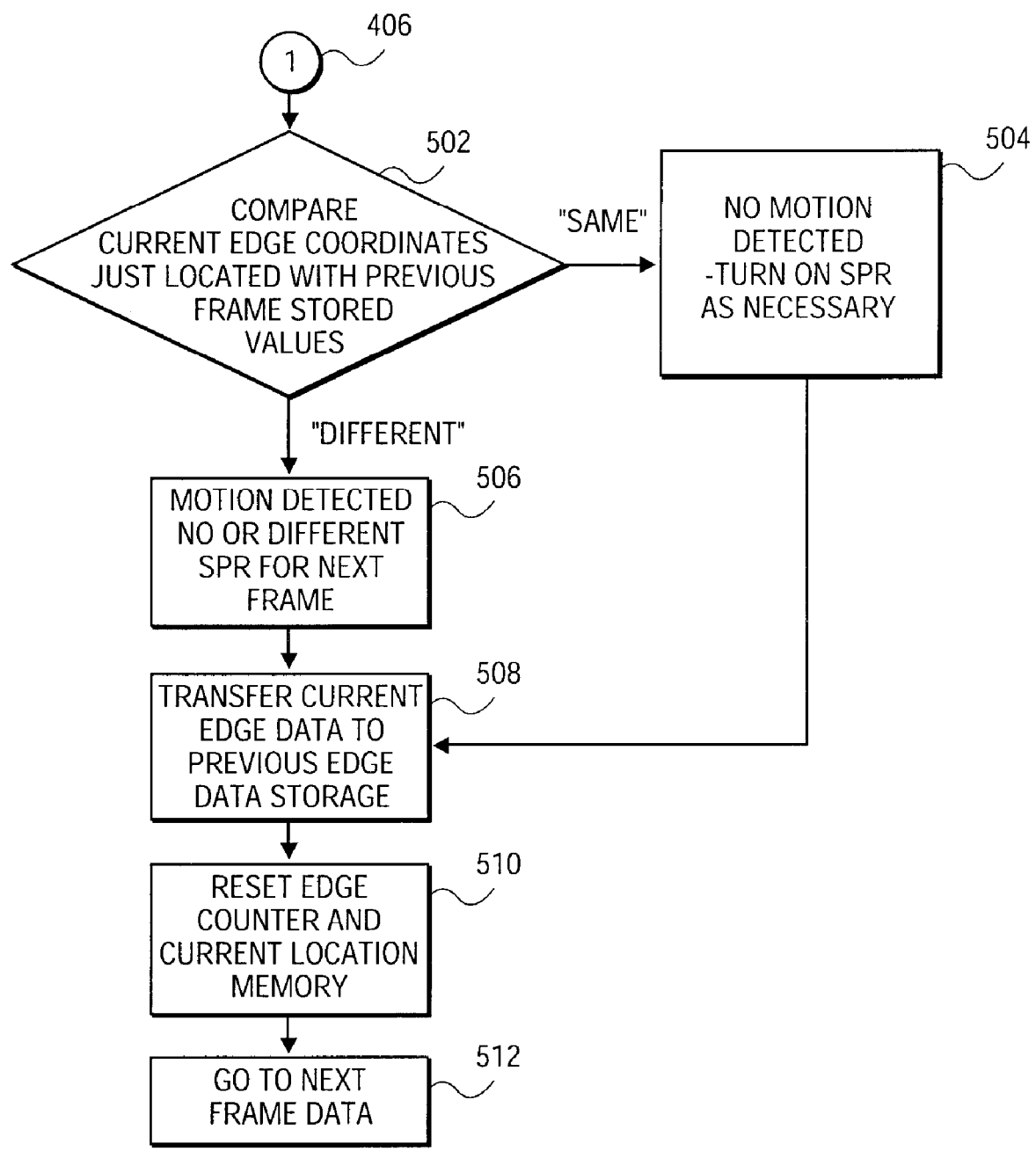

FIG. 5 continues with the processing at step 406/502 with a comparison of "current" edge points against the same points in the "previous" frame's stored values. If the comparison indicates that the current edge points are the "same" as the previous frame's edge points, then the test indicates that there is little or no motion detected and to go process the next frame of data and to turn on SPR as necessary (for example, if SPR had been turned off via this processing previously) at step 504. When, on the other hand, the comparison indicates that the current edge points are "different" enough from the previous frame's edge points, then motion is detected—enough so that the system can take corrective action at step 506—such as turning off SPR for the next frame (and other successive frames as necessary until the motion has stopped).

It should be appreciated that "same" and "different" encompass many possible metrics. "Same" could mean that not one edge point has changed (or has been added or deleted) from one frame to the next. Alternatively, "same" could mean that the system tolerates up to a certain number or a certain percentage of edge changes without need for taking corrective action. Also, the system might even take into consideration a percentage change in a certain subset area of the screen as either "same" or "different". One embodiment might consider that a certain percentage change in a smaller subset area of the screen means that there is a high possibility that there is a window opened (e.g. word processor) that does not take up the full screen and that HSF information is moving. In such a case, the system might turn off SPR for that portion of the screen and leave the remaining screen as previously treated. Of course, the level of "same" and "different" could be preset into the system according to either a heuristic analysis or an empirical data analysis. These levels may be considered threshold levels or values and may be dynamically controlled by an artificial intelligent mechanism or alternatively, be set by the users themselves.

It should also be appreciated that the "current" frame and the "previous" frame may not necessarily be successive frames. It may suffice that the "current" and "previous" frame has a relevant relationship (i.e. every other frame or the like, or two related frames in an MPEG format) that might serve as a basis of noting that motion is being detected. Additionally, instead of comparing individual points frame by frame, if there is a MPEG encoding (or some other suitable encoding), it may be possible to detect changes in motion vectors.

At step 508, the current frame's edge data is transferred to the previous frame's data and the system is effectively reset at step 510 (e.g., the edge counter and current memory location for storing edge data can be reset) and ready to process another frame's worth of image data at step 512.

It will be appreciated that there are many possible embodiments and variations on the above embodiments and notions. It would suffice for the purposes of the present invention that the system be able to detect that HSF image data is in motion and that, if there is a level of such motion detected that would—in the estimation of the system—detract from the user's perspective (i.e. too much color error introduced), then the system can take corrective actions—such as turn off sub-pixel rendering for all or a portion of the screen or effectively alter the SPR in some way to correct the viewer's experience of the image. Instead of turning off SPR, the SPR can also be changed to another filter that is less sensitive to motion artifacts of the LCD. In fact, some of the alternative corrective actions are described in the two related patent applications noted above and incorporated herein and in the other patent applications also incorporated herein.

Another alliterative way of describing this technique is as follows:

At beginning of frame, set counter to zero.
Increment counter every time an edge is detected.
Store the location of every "nth" edge detection in a temporary memory.
Compare number of edges detected to a preset number.
If number of edges exceeds preset number, then set a flag indicating "text is present".
Next frame, repeat process AND check to see if edges are stationary i.e. locations are the same of the statistical sample of edges.
If flag is set AND locations are not the same, then motion is detected. In this case, turn off all SPR on edges (when adaptive filter returns "true" value). Color error would be observed, but since the text is moving, is can not be easily seen. The rest of the image will be unchanged; for example if text is moving only in a small region of the screen.
If flag is not set AND locations are not the same, then SPR is on normally.
If flag is set AND locations are the same, then SPR is on normally.
If flag is not set AND locations are the same, then SPR is on normally.
Repeat.

Figure 6:
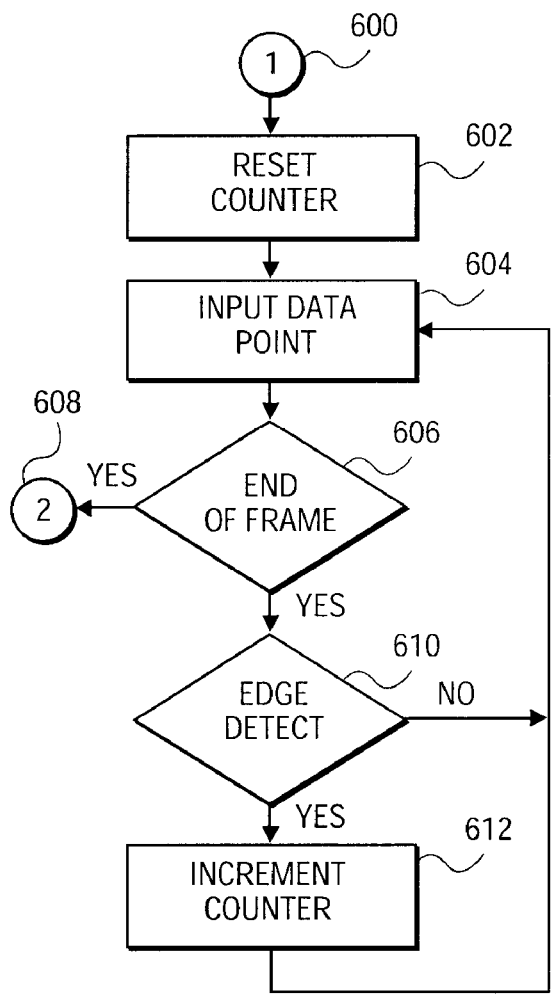
Figure 7:
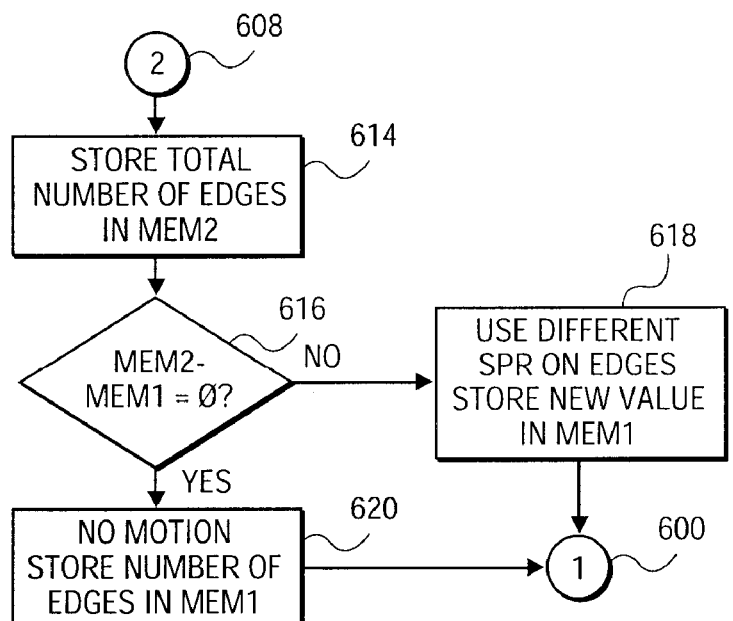

A simplification (as shown in FIGS. 6 and 7) to the above process is to just compare the number of edges from frame to frame in memories Mem1 and Mem2 that can store count values; if the number is different by a preset amount, the text is moving (as long as the number of edges exceed the minimum). Even in the case of the text being "turned off", there will be little disturbance in image quality since the action will be detected the next frame ($\frac{1}{60}^{th}$ second later) and the flag will be set to off. The size of the temporary memory (the value of "n") will depend on the accuracy required for this process. This can be determined empirically.

Referring to the embodiment starting with step 600 in FIG. 6, a counter for counting edge data points is reset at step 602. A data point is inputted at step 604. The data point is tested at step 606 to determine if the data point is at the end of a frame. If the data point is at the end of the frame, the process continues to step 608 of FIG. 7. If the data is at the end of the frame, the data point is tested at step 610 to determine if it is an edge data point. If not, the process continues from step 610 back to step 604. If yes, the counter is incremented at step 612.

At step 614 of FIG. 7 that continues from step 608 of FIG. 6, the total number of edges (i.e., the count value from the counter) is stored in a memory (Mem2). This count value can provide the total number of edges for a current frame of input data. Another memory (Mem1) can store the total number of edges for a previous frame of input data. At step 616, a test is made to determine if the total number of edges in Mem2 is different from the total number of edges in Mem1. At step 620, if the total number is not different (i.e., if Mem2–

Mem1=0), then no motion is detected and the number of edges in Mem1. At step 618, if the total number is different, motion is detected and different SPR can be applied used on the edge data points and the new value can be stored in Mem1.

As a refinement to all embodiments, the SPR could be altered on only the text or edges of HSF that areas moving and not to edges that are not moving. One embodiment for accomplishing this task is when moving edges are detected, the graphical subsystem can send a query back to the operating system to enquire as to what active windows might be open that would have moving HSF edges (e.g. word processors, image writers, etc). If there is an application having such an open window, the graphical subsystem could either ask the operating system and/or application to suspend any subpixel rendering mode for its image data inside the window or ask the operating system and/or application to give the dimensions of such window and the graphical subsystem would then alter or shut off SPR for those dimensions on screen.

An alternative embodiment that would not need to talk to the operating system might be for the graphical subsystem to turn off (or otherwise alter) SPR for all edges within a certain neighborhood of edges that are detected as moving. In this manner, most moving edges would have their SPR altered to substantially correct the color error introduced by movement. In such a case, it would be desirable to have a sufficiently large number of edges stored for comparison so that desirable subsets of the screen (i.e. scrolling windows) would be shut off or suitably altered.

It has now been disclosed several embodiments of the techniques, systems and methods of the present invention. It should be appreciated the many variations on these embodiments are possible and that the scope of the present invention is not limited to the embodiments disclosed herein; but encompasses the many possible variations to the same.

What is claimed is:

1. A method for improving viewing characteristics of moving text or areas of high spatial frequency, the method implemented in a display system comprising a subpixel rendering system, the method comprising:
   automatically noting points of high spatial frequency in a first frame of image data;
   automatically comparing the points of high spatial frequency with corresponding points in a second frame of image data; and
   when a number of points meeting a certain threshold have changed from high spatial frequency in the second frame, automatically changing the subpixel rendering on input image data and turning the subpixel rendering off in successive frames of image data such that visual error due to movement of said high spatial frequency across said display system is reduced.

2. The method as recited in claim 1 wherein automatically noting points of high spatial frequency further comprises storing a number of points that satisfy a test for whether a point is an edge point of text or other areas of high spatial frequency.

3. The method as recited in claim 1 wherein automatically noting points of high spatial frequency further comprises storing every n-th point that satisfies a test for whether a point is an edge point of text or other areas of high spatial frequency.

4. The method as recited in claim 1 wherein automatically noting points of high spatial frequency further comprises noting motion vectors in said first frame that have a video encoding that utilizes such motion vectors.

5. The method as recited in claim 4 wherein automatically comparing the points of high spatial frequency with corresponding points in a second frame of image data further comprises noting motion vectors in said second frame and determining if there is a difference between said motion vectors in said second frame and said motion vectors in said first frame.

6. The method as recited in claim 1 wherein automatically comparing the points of high spatial frequency with corresponding points in a second frame of image data further comprises noting points in said second frame corresponding to the location of points of high spatial frequency in said first frame and testing the points in the second frame to determine if the points are of high spatial frequencies.

7. A method for improving viewing characteristics of moving text or areas of high spatial frequency, the method implemented in a display system comprising a subpixel rendering system, the method comprising:
   automatically noting points of high spatial frequency in a first frame of image data;
   automatically comparing the points of high spatial frequency with corresponding points in a second frame of image data; and
   when a number of points meeting a certain threshold have changed from high spatial frequency in the second frame, automatically determining which portion of the frame meets said certain threshold; and automatically changing the subpixel rendering of high spatial frequency image data and turning the subpixel rendering off in successive frames of image data in said portion of the frame.

8. A graphical subsystem for a liquid crystal display, said display comprising a plurality of colored subpixels, said graphical subsystem comprising:
   a subpixel rendering subsystem;
   a memory coupled to said subpixel rendering subsystem for storing input image data regarding a plurality of image frames, and
   a processing subsystem that tests for moving text or other points of high spatial frequency and, when the test indicates moving text or said other areas of high spatial frequency, sends signals to said subpixel rendering subsystem to change the subpixel rendering upon said colored subpixels and to turn said subpixel rendering off in successive frames of image data.

9. The graphical subsystem as recited in claim 8 wherein said subpixel rendering subsystem comprises one of a group, said group comprising: an ASIC, an FPGA, TFTs implemented on glass, or a computer-readable medium containing instructions to be executed on a general processor.

10. The graphical subsystem as recited in claim 8 wherein said processing subsystem is implemented as a part of said subpixel rendering subsystem.

11. A computer readable non-transitory medium, said medium having instructions that, when read by a general processing system, performs a method for improving viewing characteristics of moving text or areas of high spatial frequency upon liquid crystal displays comprising a plurality of colored subpixels, said method comprising:
   noting points of high spatial frequency in a first frame of image data;
   comparing the points of high spatial frequency with corresponding points in a second frame of image data; and
   when a number of points meeting a certain threshold have changed from high spatial frequency in the second frame, changing the subpixel rendering of input image data upon said colored subpixels and turning the subpixel rendering off.

12. A subpixel rendering (SPR) system for displaying image data on displays having a plurality of colored subpixels, the SPR comprising:
- means for detecting points of high spatial frequency in a first frame of image data;
- means for comparing the detected points of high spatial frequency with corresponding points in a second frame of image data; and
- when the points of high spatial frequency are different in the second frame of image data from the points of high spatial frequency in the first frame of image data, means for changing subpixel rendering of input image data upon said colored subpixels and turning the subpixel rendering off.

13. The subpixel rendering system as recited in claim 12 wherein the points relate to text data.

14. The subpixel rendering system as recited in claim 12 further comprising means for changing the subpixel rendering in successive frames of image data.

* * * * *